(12) United States Patent
Hoeben

(10) Patent No.: US 9,936,685 B2
(45) Date of Patent: Apr. 10, 2018

(54) HOODED FIELD CROP SPRAY APPARATUS FOR SPRAYING CROPS

(76) Inventor: Henricus Johannes Godefridus Maria Hoeben, Maarheeze (NL)

( * ) Notice: Subject to any disclaimer, the term of this patent is extended or adjusted under 35 U.S.C. 154(b) by 216 days.

(21) Appl. No.: 13/448,115

(22) Filed: Apr. 16, 2012

(65) Prior Publication Data

US 2012/0248218 A1    Oct. 4, 2012

Related U.S. Application Data

(63) Continuation of application No. PCT/NL2009/000197, filed on Oct. 15, 2009.

(51) Int. Cl.
*B05B 1/28* (2006.01)
*A01M 7/00* (2006.01)

(52) U.S. Cl.
CPC ............. *A01M 7/0064* (2013.01); *B05B 1/28* (2013.01)

(58) Field of Classification Search
CPC ......... B05B 1/28; B05B 15/04; A01M 7/0064
USPC .............. 239/150–159, 147, 288.5, 566
See application file for complete search history.

(56) References Cited

U.S. PATENT DOCUMENTS

| 3,439,875 | A | * | 4/1969 | Sorapure | B60V 1/046 180/128 |
| 3,804,332 | A | * | 4/1974 | Welch | A01M 7/0014 239/168 |
| 4,641,781 | A | * | 2/1987 | McCrea | A01M 7/0064 239/159 |
| 4,646,971 | A | * | 3/1987 | Rogers | A01M 7/0042 239/166 |
| 4,660,762 | A | * | 4/1987 | Spillman | 239/1 |
| 4,748,769 | A | * | 6/1988 | Kolskog et al. | 47/1.5 |
| 5,433,758 | A | * | 7/1995 | Thompson et al. | 47/58.1 R |
| 5,778,646 | A | * | 7/1998 | Pfisterer | 56/16.4 R |
| 5,971,295 | A | * | 10/1999 | Jensen | A01M 7/0014 239/168 |
| 6,273,154 | B1 | * | 8/2001 | Laug | 141/97 |
| 6,334,578 | B1 | * | 1/2002 | House | A01M 7/0014 239/159 |
| 2008/0061169 | A1 | * | 3/2008 | Copeland | 239/566 |

FOREIGN PATENT DOCUMENTS

| FR | 2925861 | 7/2010 |
| GB | 2162732 | 2/1986 |

* cited by examiner

*Primary Examiner* — Arthur O Hall
*Assistant Examiner* — Joel Zhou
(74) *Attorney, Agent, or Firm* — Luoh J. Wu; Continent Patent Office LLP

(57) ABSTRACT

An apparatus comprises an upper air guide hood and a lower air guide hood spaced from each other. Spray nozzles are arranged between these two air guide hoods. The air guide hoods hang above or just in the tops of the crops. During the migration of the apparatus the crop is as it were torn open by the wind and/or by contact with the apparatus, so that the spray liquid is distributed among the crop.

6 Claims, 3 Drawing Sheets

HOODED FIELD CROP SPRAY APPARATUS FOR SPRAYING CROPS

CROSS-REFERENCE TO RELATED APPLICATIONS

This application for a utility patent is a continuation of a previously filed PCT application, now abandoned, having the application number PCT/NL2009/000197, filed Oct. 15, 2009.

DESCRIPTION

Field of the Invention

The invention relates to a hooded field crop spray apparatus for spraying crops, which apparatus is suitable for attachment to a spray vehicle and comprises a plurality of spray nozzles for spraying a spray liquid, as well as air guide for guiding the spray liquid to the crop and avoiding the spray liquid being blown away, which air guide comprise at least two parallel air guide hoods spaced from each other which extend in longitudinal direction at right angles to the direction of movement of the vehicle and between which the spray nozzles are arranged, which air guide hoods have an inside curved inwards as well as an outside curved outwards, while between the air guide hoods an air channel is formed having an air intake opening taking in the air flow and an air outlet opening from which the air mixed with the spray liquid is allowed to flow.

When crops are sprayed with farm machinery, spray liquid is distributed over the crop through a plurality of spray nozzles. In this process a 'cloud' of spray liquid is developed above the crop. Part of this is lost in the air as a result of evaporation and what is called drift, which is the blowing away of the spray liquid. This causes the environment to be polluted, especially when spraying is done with fine drops which are much more effective than large drops which more often than not run down from the crop.

State of the Art

A hooded field crop spray apparatus of this type is known from U.S. Pat. No. 6,334,578. The air guide hoods guide the air flow that is caused by the wind while the spray liquid mixes with the air and is guided and applied to the crop by means of a hood.

SUMMARY OF THE INVENTION

It is an object of the invention to improve the known field crop spray apparatus. To this end the field crop spray apparatus according to the invention is characterized in that the air intake opening is located between the two air guide hoods while the inside of each air guide hood extends from the air intake opening to the air outlet opening. In consequence, the air is guided better past the spray nozzles, so that the spray liquid is taken along better by the air flow and is guided to the crop in a more effective way.

An embodiment of the apparatus according to the invention is characterized in that the air intake opening and air outlet opening in essence extend over the entire length of the air guide hoods. This provides that more air is led past the spray nozzles, so that the spray liquid is applied to the crop in an even more effective way.

Preferably the spray nozzles are situated in the direct path of air from the air intake opening to the air outlet opening so that the spray liquid is taken along better by the air.

A further embodiment of the apparatus according to the invention is characterized in that the distance between the insides of the air guide hoods from the air intake opening to the air outlet opening at first stays substantially the same or diminishes and then increases. This causes the air flow to accelerate, leading to the spray liquid being applied to the crop in an even more effective way.

Yet a further embodiment of the apparatus according to the invention is characterized in that the hood mount brackets are hollow and open at the front and the bottom part of the upper air guide hood is hollow and air outlet openings are provided in the bottom part of the upper air guide hood. Air guide channels are formed in this manner in the hood mount brackets and the upper air guide hood while at the back of the apparatus the air passing through the air guide channels shields the space between the air guide hood and the crop and thus avoids drift and evaporation of the spray liquid.

Preferably the channel situated between the two air guide hoods, seen in side elevation, is arcuate and extends in essence over a 90 degree angle so as to deflect vertically downwards the air that is essentially directed horizontally.

Again a further embodiment of the apparatus according to the invention is characterized in that the cross sections of the air guide hoods have the shape of wing profiles. As a result, the air is guided more effectively so that no undesired turbulence is developed. The air passing along the top of the upper air guide hood shields at the back the space between the air guide hood and the crop and in this way prevents drift and evaporation of the spray liquid. A characterizing feature of the shape of a wing profile is that the air passing along the top of the wing profiles covers a longer distance than the air passing along the underside.

Yet again a further embodiment of the apparatus according to the invention is characterized in that flexible air guide flaps are attached to the back parts of the air guide hoods seen in the direction of movement. These flaps provide an even better way of applying the spray liquid to the crop and minimizes the chance of the wind blowing away the spray liquid.

Still a further embodiment of the apparatus according to the invention is characterized in that the apparatus further includes mounting element for mounting the air guide hoods to a carrier bracket while the air guide hoods are attached to the mounting element in an unconstrained manner. The mounting element may comprise for example a parallelogram construction from which the air guide hoods are suspended by means of hinges. This parallelogram construction is then attached to the carrier bracket. The presence of the parallelogram construction provides that the air guide hoods are free to move up and down and the hinged suspension provides that they are free to turn. The great advantage of a freely suspended air guide hood is that when no crop is contacted or when there is little wind, the air guide hoods will tilt. When a spray operation is started at the beginning of a field, the air guide hoods are hanging down. When, subsequently, spraying commences, substantially nothing is lost in for example a ditch. This provides that when spray liquid is applied by means of the spray apparatus according to the invention not just the emission to the open air is restricted, also the emission to the surface water is drastically reduced. This makes possible the spraying with fine droplets so that large drops do not roll off the crop and thus a burden on the surface water is avoided. When, subsequently, the apparatus is migrated above the crop, the contact with the crop and/or the wind provides that the air guide hoods adopt the optimum position.

BRIEF DESCRIPTION OF THE DRAWINGS

The following description relating to the appended drawings, the whole given by way of non-limiting example of the apparatus according to the invention, will provide better understanding of how the invention can be realized, in which:

DETAILED DESCRIPTION OF THE DRAWINGS

Figure 1:
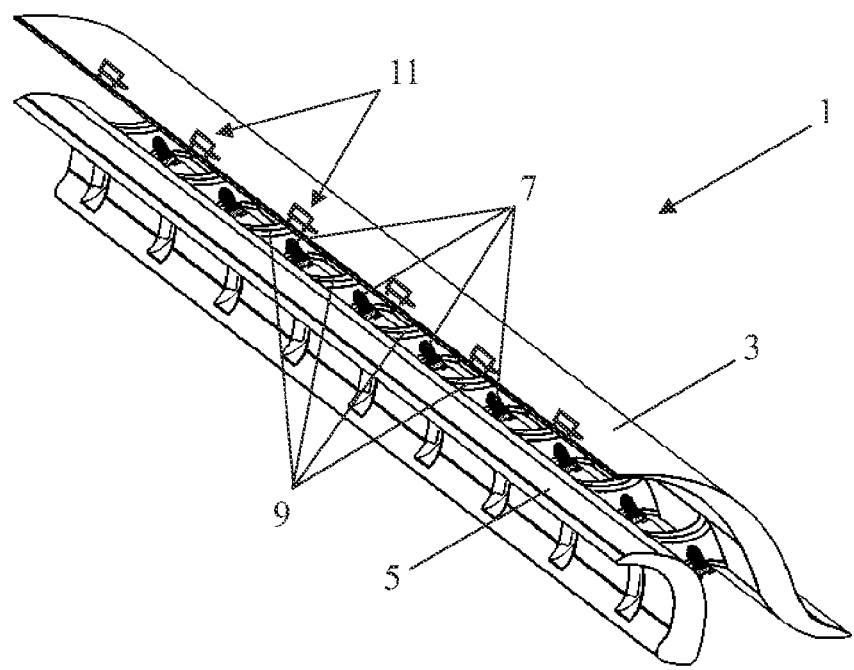
FIG. 1 shows an embodiment of the apparatus according to the invention in a perspective inclined plan view.
Figure 2:
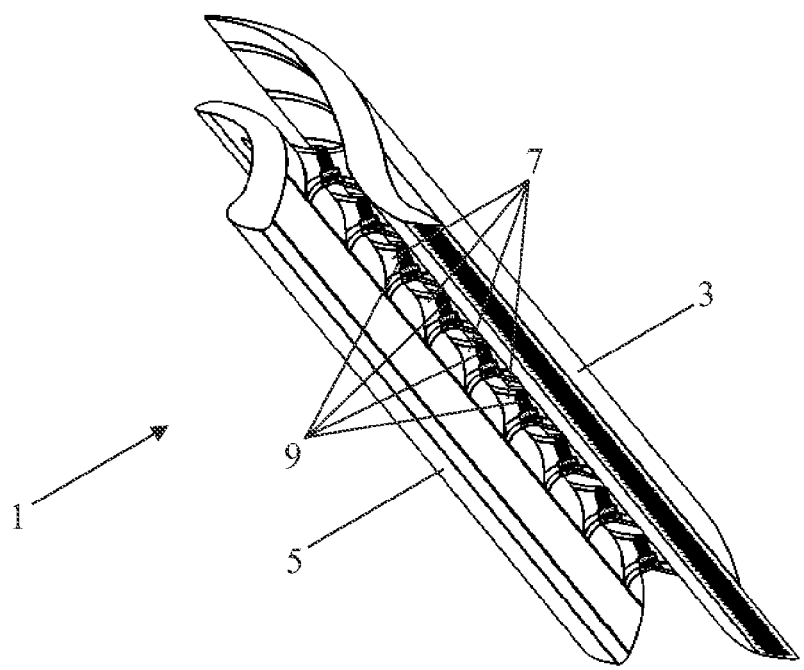
FIG. 2 shows an embodiment of the apparatus according to the invention in a perspective inclined bottom view.

FIGS. 1 and 2 show in a perspective view an embodiment of the apparatus according to the invention for hooded spraying of field crops. The apparatus 1 comprises an upper air guide hood 3 and a lower air guide hood 5 spaced at a distance therefrom. Spray nozzles 7 attached to hood mount brackets 9 are located between the two air guide hoods. The brackets provide the connection between the two air guide hoods 3 and 5 and for supporting the spray nozzles. Flexible flaps may optionally be attached to the lower ends of the air guide hoods.

The apparatus 1 further includes attachment element 11 for attaching the apparatus to a carrier bracket which can be coupled to a trailer. The attachment element are hinged to the upper air guide hood 3.

Figure 3:
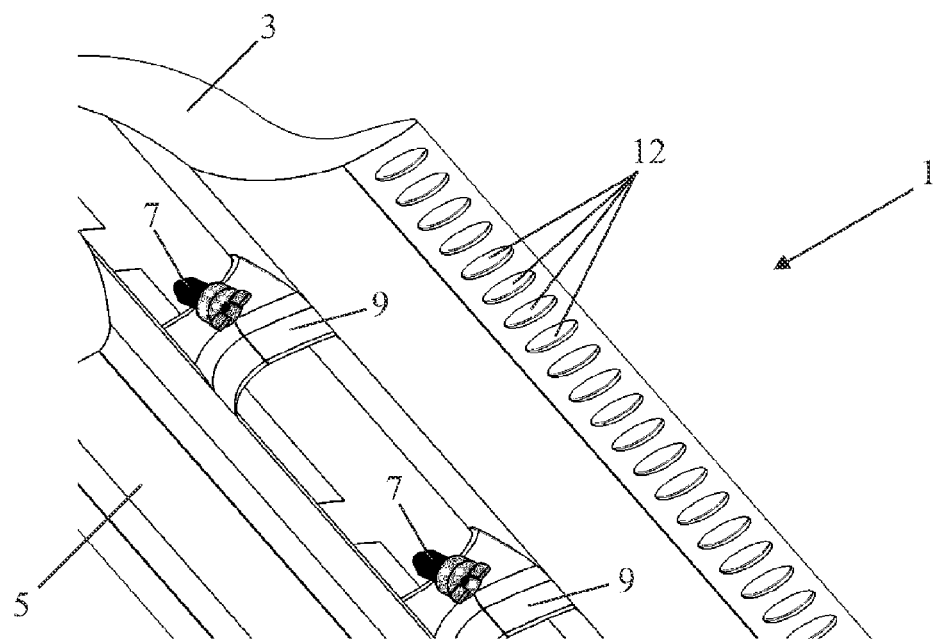
FIG. 3 shows a detail of the apparatus seen from below.
Figure 4:
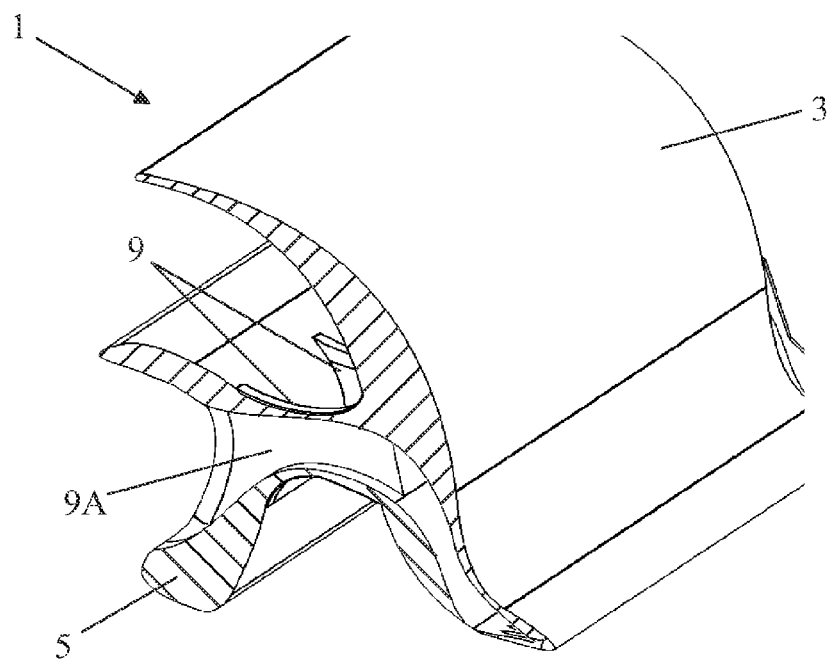
FIG. 4 shows a cross-sectional view of the apparatus in the place of one of the hood mount brackets.

FIGS. 3 and 4 show the apparatus 1 in detail, The hood mount brackets 9 are hollow and open at the front. Further the bottom part of the upper air guide hood 3 is hollow and the bottom end of the upper air guide hood has outlet openings 12. In this manner air channels 9A are formed in the hood mount brackets and the upper air guide hood while at the back of the apparatus the air passing through the air guide channels shields the space between the air guide hood and the crop and thus avoids drift and evaporation of the spray liquid.

Figure 5:
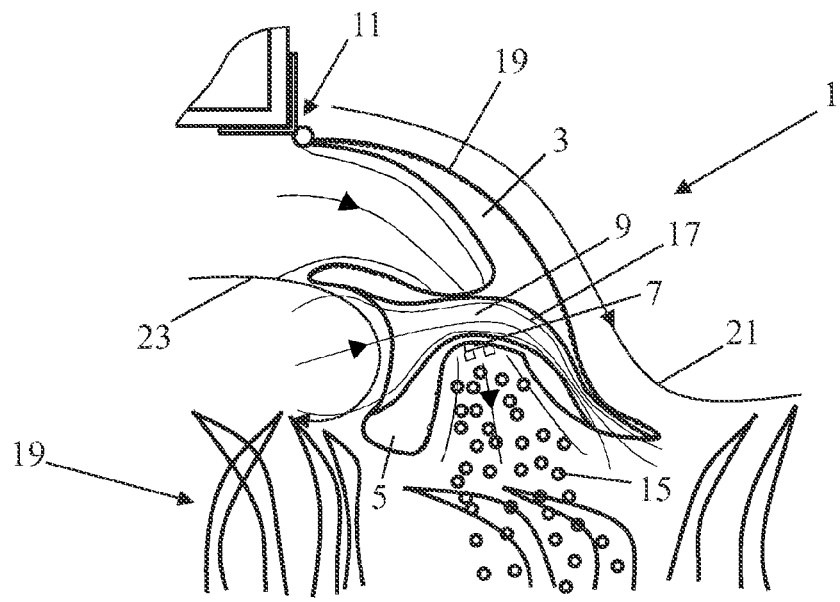
FIG. 5 shows a cross-sectional view of the apparatus during migration above a crop.
Figure 6:
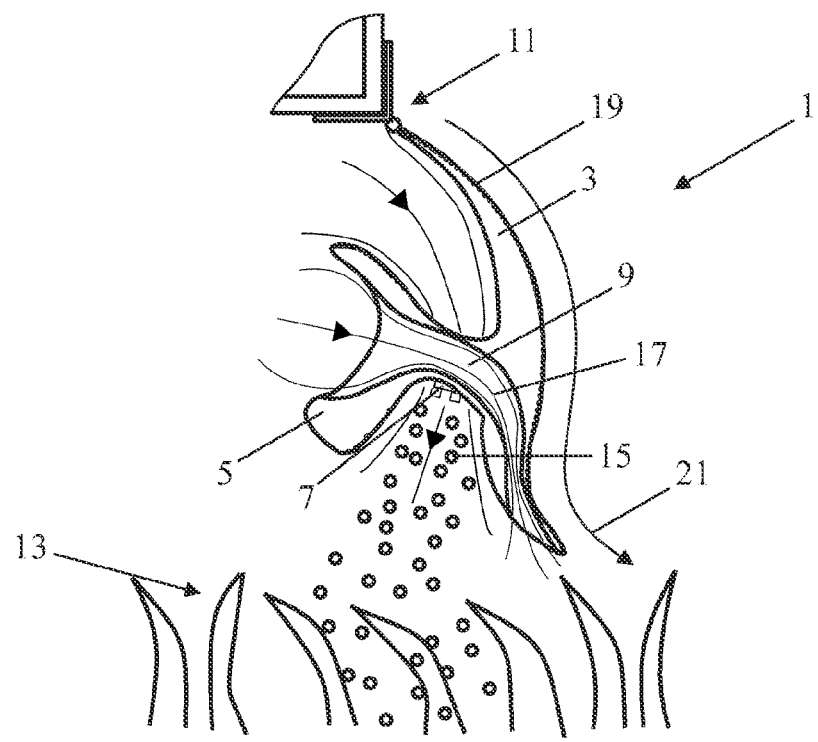
FIG. 6 shows a cross-sectional view of the apparatus during standstill.

FIG. 5 shows a cross-sectional view of the apparatus during migration above a crop. The air guide hoods 3, 5 hang above or just in the tops of a crop 13. During the migration of the apparatus the crop is as it were torn open by the wind and/or by contact with the apparatus, so that the spray liquid 15 is distributed among the crop. The back side of the apparatus provides a loss-free shielding by means of the air flow 17 which continues to be directed at the sprayed crop. This presses down the vapours in the crop, so that there is mention of a proper penetration into the crop as well as a considerable reduction of emission of the spray liquid. Emission that would otherwise be lost on drift and evaporation and rolling off of the spray liquid and hence would burden the environment.

The pressure with which the mixture of air and spray liquid 15 ends up in the crop 13 is dependent on the shape of the air guide hoods and the speed of migration (4-20 km/h). By a proper design at the back of the air guide hoods and possible other techniques such as small hollows 19 situated on the upper air guide hood or suction of the bounding layer or coating with dirt and liquid-repellent agent, turbulence is avoided so that the laminar air flow 21 continues to follow the shape of the upper air guide hood. This air flow 21 prevents fine droplets and vapours of spray liquid from ending up in the environment by pressing them again into the crop. This effect is achieved by sending as it were a blanket of air over the crop.

The spray nozzles 7 are installed in principle at a 30 degree angle relative to the vertical when the apparatus is migrated over the crop. There is a variable distance from the spray nozzles 7 to the crop 13. Both the angle and the distance can be adjusted for obtaining the best result. The air guide hoods 3, 5 are suspended by means of hinges, bounded by stops as desired. The contact of the lower air guide hood 5 with the crop and the wind determine the position of the apparatus. The apparatus may optionally be provided with a mechanically adjustable hood.

In case there is no contact with the crop or no wind (standstill), see FIG. 3, the spray nozzles 10 have a 10 degree pitch. If so desired the spraying operation may be carried out without the crop being hit, that is to say, with a shielded spray mist so that drift and evaporation are avoided. The air flow 23 along the bottom of the lower air guide hood 5 sets the crop in motion. The air flow 21 over the top of the upper air guide hood 3 provides a shielding of the mist of the mixture of air and spray liquid 15.

Albeit the invention has been described in the foregoing based on the drawings, it should be observed that the invention is not by any manner or means restricted to the embodiment shown in the drawings. The invention also extends to all embodiments deviating from the embodiment shown in the drawings within the spirit and scope defined by the claims. For example, the spray nozzles 7 may also be connected to one of the air guide hoods, in which case the hood mount brackets 9 may be omitted as desired.

What is claimed is:

1. A hooded field crop spray apparatus for spraying crops, which apparatus is suitable for attachment to a spray vehicle and comprises a plurality of spray nozzles for spraying a spray liquid, as well as air guide means for guiding the spray liquid to the crop and avoiding the spray liquid being blown away, the air guide means comprise two, as seen in longitudinal cross section, parallel face to face air guide hoods spaced from each other which extend in longitudinal direction at right angles to the direction of movement of the vehicle in use and between which the spray nozzles are arranged, which air guide hoods have an inside, wherein both insides facing each other, as well as an outside, wherein both outsides facing away from each other, while between the air guide hoods an air channel is formed having an air intake opening taking in the air flow and an air outlet opening from which the air mixed with the spray liquid is allowed to flow, wherein the air intake opening is located between the two air guide hoods while the inside of each air guide hood extends from the air intake opening to the air outlet opening, and the spray nozzles are situated in the direct path of the air from the air intake opening to the air outlet opening, and wherein the air intake opening and air outlet opening in essence extend, as seen in longitudinal direction, over the entire length of the air guide hoods, and wherein of the lower one of the air guide hoods over a distance at least half the length of the lower guide hood measured in the direction of said path of air from the air inlet opening towards the air outlet opening the inside is curved convexly and the outside is curved concavely and of the other upper guide hood over a distance at least half the length of the upper guide hood measured in the direction of said path of air from the air inlet opening towards the air outlet opening the inside is curved concavely and the outside is curved convexly.

2. An apparatus as claimed in claim 1, wherein hood mount brackets are provided which are present between the two air guide hoods and connect them, which hood mount brackets are hollow and open at the front and the bottom part of the upper air guide hood is hollow and air outlet openings are provided in the bottom part of the upper air guide hood.

3. An apparatus as claimed in claim 1, wherein the channel situated between the two air guide hoods, seen in side elevation, arcuate and extends in essence over a 90 degree angle so as to deflect vertically downwards the air that is essentially directed horizontally.

4. An apparatus as claimed in claim 1, wherein the cross sections of the air guide hoods have the shape of wing profiles.

5. An apparatus as claimed in claim 1, wherein flexible air guide flaps are attached to the back parts of the air guide hoods seen in the direction of movement.

6. An apparatus as claimed in claim 1, wherein the apparatus further includes mounting means for mounting the air guide hoods to a carrier bracket while the air guide hoods are attached to the mounting means in an unconstrained manner.

\* \* \* \* \*